(12) United States Patent
Peng et al.

(10) Patent No.: US 10,284,337 B2
(45) Date of Patent: May 7, 2019

(54) DATA TRANSMISSION METHOD AND DATA TRANSMISSION DEVICE

(71) Applicant: CHINA ACADEMY OF TELECOMMUNICATIONS TECHNOLOGY, Beijing (CN)

(72) Inventors: Ying Peng, Beijing (CN); Shaoli Kang, Beijing (CN); Fei Qin, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 54 days.

(21) Appl. No.: 15/526,734

(22) PCT Filed: Sep. 14, 2015

(86) PCT No.: PCT/CN2015/089546
§ 371 (c)(1),
(2) Date: May 12, 2017

(87) PCT Pub. No.: WO2016/074530
PCT Pub. Date: May 19, 2016

(65) Prior Publication Data
US 2017/0338906 A1  Nov. 23, 2017

(30) Foreign Application Priority Data

Nov. 14, 2014  (CN) .......................... 2014 1 0649623

(51) Int. Cl.
*H04L 1/00* (2006.01)
*H04L 1/18* (2006.01)
(Continued)

(52) U.S. Cl.
CPC ........ *H04L 1/0071* (2013.01); *H04J 11/0043* (2013.01); *H04L 1/00* (2013.01);
(Continued)

(58) Field of Classification Search
CPC . H04L 1/00; H04L 1/0071; H04L 5/22; H04L 1/1893; H04L 1/18; H04J 11/0043; H04W 88/02
(Continued)

(56) References Cited

U.S. PATENT DOCUMENTS 7,957,483 B2 * 6/2011 Yu .......................... H04L 5/0023
375/260
8,451,932 B2 * 5/2013 Onggosanusi ....... H04B 7/0426
375/260
(Continued)

FOREIGN PATENT DOCUMENTS

CN   101662344 A   3/2010
CN   102111878 A   6/2011
(Continued)

OTHER PUBLICATIONS

Zhao Rui et al., "A Joint Detection Based on the DS Evidence Theory for Multi-User Superposition Modulation"; Network Infrastructure and Digital Content (IC-NIDC); 2014 4th IEEE International Conference; Sep. 21, 2014; pp. 390-393.
(Continued)

*Primary Examiner* — Man U Phan
(74) *Attorney, Agent, or Firm* — Ladas & Parry, LLP

(57) ABSTRACT

A data transmission method and a data transmission device are provided. A transmission device classifies data symbols for each scheduled user into groups based on logic resource element groups determined based on encoding matrices each multiplexed by multiple users, encodes respective groups of data symbols for each user in accordance with the encoding matrices to determine groups of encoded data symbols for each user, subjects respective groups of encoded data symbols for each user to a mapping treatment based on logic resource elements, maps respective logic resource element groups to a physical resource block in accordance with a
(Continued)

mapping mode, and transmits data to a reception device based on the physical resource block.

20 Claims, 7 Drawing Sheets

(51) Int. Cl.
*H04L 5/22* (2006.01)
*H04J 11/00* (2006.01)
*H04W 88/02* (2009.01)

(52) U.S. Cl.
CPC .............. *H04L 1/1893* (2013.01); *H04L 5/22* (2013.01); *H04W 88/02* (2013.01)

(58) Field of Classification Search
USPC .................................................. 370/328–352
See application file for complete search history.

(56) References Cited

U.S. PATENT DOCUMENTS

| | | | | |
|---|---|---|---|---|
| 8,462,899 B2* | 6/2013 | Wang | ................... | H04L 5/0007 375/144 |
| 8,625,710 B2* | 1/2014 | Damnjanovic | ......... | H04L 5/001 370/203 |
| 8,630,362 B1* | 1/2014 | von der Embse | .......................... | H04L 25/03171 375/260 |
| 9,236,927 B2* | 1/2016 | Stadelmeier | ......... | H04B 7/0689 |
| 9,553,645 B2* | 1/2017 | Lee | ...................... | H04B 7/0413 |
| 9,712,292 B2* | 7/2017 | Mun | ....................... | H04H 20/72 |
| 2012/0263132 A1* | 10/2012 | Guan | .................... | H04L 5/0007 370/329 |
| 2016/0028513 A1* | 1/2016 | Werner | ................. | H04L 5/0007 370/330 |
| 2017/0155484 A1* | 6/2017 | Kang | ........................ | H04L 1/06 |

FOREIGN PATENT DOCUMENTS

| | | |
|---|---|---|
| CN | 104113387 A | 10/2014 |
| EP | 2226982 A1 | 9/2010 |
| EP | 2381588 A2 | 10/2011 |

OTHER PUBLICATIONS

Xiaohang Chen et al.: "Multi-User Proportional Fair Scheduling for Uplink Non-Orthogonal Multiple Access (NOMA)"; 2014 IEEE 79th Vehicular Technology Conference (VTC 2014-Spring); Seoul, Korea; May 18-21, 2014; pp. 1-5.

Xiaoming Dai et al.: "Successive interference cancelation amenable multiple access (SAMA) for future wireless Communications"; 2014 IEEE International Conference on Communication Systems; Nov. 1, 2014; pp. 222-226.

From PCT/CN2015/089546: International Search Report dated Dec. 21, 2015 and its English translation from WIPO.

From PCT/CN2015/089546: Written Opinion dated Dec. 21, 2015 and its English translation from WIPO.

From PCT/CN2015/089546: Chapter 1 International Preliminary Report on Patentability (IPRP) dated May 26, 2017 and its English translation from WIPO.

From EPO Application No. 15858904.4: Supplementary European Search Report and Search Opinion dated Oct. 6, 2017.

* cited by examiner

| VEG #( logic resource element groups) | | | | | | |
|---|---|---|---|---|---|---|
| 0 | 16 | 5 | 21 | 10 | 26 | 15 |
| 4 | 20 | 9 | 25 | 14 | 3 | 19 |
| 8 | 24 | 13 | 2 | 18 | 7 | 23 |
| 12 | 1 | 17 | 6 | 22 | 11 | 27 |

| VEG # | | | | | | |
|---|---|---|---|---|---|---|
| 23 | 8 | 24 | 13 | 2 | 18 | 7 |
| 27 | 12 | 1 | 17 | 6 | 22 | 11 |
| 0 | 16 | 5 | 21 | 10 | 26 | 15 |
| 4 | 20 | 9 | 25 | 14 | 2 | 19 |

| VEG #( logic resource element groups) | | | | | | |
|---|---|---|---|---|---|---|
| 0 | 4 | 8 | 12 | 16 | 20 | 24 |
| 1 | 5 | 9 | 13 | 17 | 21 | 25 |
| 2 | 6 | 10 | 14 | 18 | 22 | 26 |
| 3 | 7 | 11 | 15 | 19 | 23 | 27 |

| VEG # | | | | | | |
|---|---|---|---|---|---|---|
| 26 | 2 | 6 | 10 | 14 | 18 | 22 |
| 27 | 3 | 7 | 11 | 15 | 19 | 23 |
| 0 | 4 | 8 | 12 | 16 | 20 | 24 |
| 1 | 5 | 9 | 13 | 17 | 21 | 25 |

DATA TRANSMISSION METHOD AND DATA TRANSMISSION DEVICE

CROSS-REFERENCE TO RELATED APPLICATION

The present application is the U.S. national phase of PCT/CN2015/089546 filed on Sep. 14, 2015, which claims priority to the Chinese patent application No. 201410649623.1 filed on Nov. 14, 2014, the disclosures of which are incorporated herein by reference in their entireties.

TECHNICAL FIELD

The present disclosure relates to the field of wireless communication technology, in particular to a data transmission method and a data transmission device.

BACKGROUND

In the $1^{st}$-Generation mobile communication technology to the current $4^{th}$-Generation (4G) mobile communication technology, as a traditional mobile communication multiple access technique, an orthogonal multiple access technique such as Frequency Division Multiple Access (FDMA), Time Division Multiple Access (TDMA), Code Division Multiple Access (CDMA) or Space Division Multiple Access (SDMA) is used to share wireless resources. In a 4G system, an orthogonal and synchronous Frequency Division Duplex technique is adopted, and time-frequency resource blocks occupied by respective users are different from each other.

In terms of a multiple-user information theory, it is merely able for an orthogonal mode to reach an inner bound of a multiple user capacity. In accordance with the multiple-user information theory, for a broadcasting channel, achievable rates for two users form a convex pentagon, and a most marginal rate may be superposition-coded (non-orthogonally coded) at a transmitting end. In other words, signals to be transmitted to the two users may be linearly superposed by a base station, and then transmitted through an identical physical resource. At a receiving end, an interference cancellation receiver may be adopted. In this way, it is able to provide a multiple-user system capacity larger than that in the orthogonal mode. The non-orthogonal access technique has a potential advantage in improving spectrum efficiency.

A Pattern Division Multiple Access (PDMA) technique is a technique capable of performing joint treatment at both the transmitting end and the receiving end on the basis of optimization of a multiple-user communication system. At the transmitting end, the users may be differentiated from each other on the basis of non-orthogonal characteristic patterns for multiple signal domains, and at the receiving end, the multiple-user detection may be performed in a serial interference cancellation mode on the basis of characteristic structures of user patterns. In this way, it is able for the users to further multiplex the existing time-frequency wireless resources.

However, currently there is no scheme for resource mapping in the non-orthogonal access mode.

SUMMARY

The present disclosure provides a data transmission method and a data transmission device, to perform resource mapping in the non-orthogonal access mode.

In one aspect, the present disclosure provides in some embodiments a data transmission method, including steps of: classifying, by a transmission device, data symbols for each user scheduled through Media Access Control (MAC) based on logic resource element groups determined based on encoding matrices each multiplexed by multiple users; encoding, by the transmission device, respective groups of data symbols for each user in accordance with the encoding matrices, to determine groups of encoded data symbols for each user; subjecting, by the transmission device, respective groups of encoded data symbols for each user to a mapping treatment based on logic resource elements; mapping, by the transmission device, respective logic resource element groups to a physical resource block in accordance with a mapping mode; and transmitting, by the transmission device, data to a reception device based on the physical resource block.

In a possible embodiment of the present disclosure, resource elements corresponding to each encoding matrix multiplexed by the multiple users are determined by the transmission device as one logic resource element group.

In a possible embodiment of the present disclosure, the step of mapping, by the transmission device, the respective logic resource element groups to the physical resource block in accordance with the mapping mode includes: mapping, by the transmission device, the respective logic resource element groups to a logic resource block and mapping the logic resource block to the physical resource block, in accordance with the mapping mode; or mapping, by the transmission device, the respective logic resource element groups directly to the physical resource block in accordance with the mapping mode.

In a possible embodiment of the present disclosure, the step of mapping, by the transmission device, the respective logic resource element groups to the logic resource block and mapping the logic resource block to the physical resource block in accordance with the mapping mode includes: mapping, by the transmission device, the logic resource element groups to the logic resource block in a time-domain-before-frequency-domain or frequency-domain-before-time-domain order; or interleaving, by the transmission device, the logic resource element groups, and then mapping the interleaved logic resource element groups to the logic resource block.

In a possible embodiment of the present disclosure, the step of mapping, by the transmission device, the respective logic resource element groups directly to the physical resource block in accordance with the mapping mode includes: mapping, by the transmission device, the logic resource element groups to the physical resource block in a time-domain-before-frequency-domain or frequency-domain-before-time-domain order; or interleaving, by the transmission device, the logic resource element groups and then mapping the interleaved logic resource element groups to the physical resource block; or subjecting, by the transmission device, the logic resource element groups to an inter-group frequency-hopping treatment and then mapping resultant logic resource element groups to the physical resource block.

In a possible embodiment of the present disclosure, the transmission device is a User Equipment (UE), and the reception device is a network side device. The step of subjecting, by the transmission device, the respective groups of encoded data symbols for each user to the mapping treatment based on the logic resource elements includes:

mapping, by the transmission device, the groups of encoded data symbols for each user to different logic resource element groups respectively.

In a possible embodiment of the present disclosure, prior to the step of classifying, by the transmission device, the data symbols for each scheduled user into groups based on the logic resource element groups determined based on the encoding matrices each multiplexed by the multiple users, the data transmission method further includes receiving, by the transmission device, the encoding matrices and/or the mapping mode set by the network side device.

In a possible embodiment of the present disclosure, the transmission device is a network side device, and the reception device is a UE. The step of subjecting, by the transmission device, the respective groups of encoded data symbols for each user to the mapping treatment based on the logic resource elements includes: mapping, by the transmission device, each group of encoded data symbols for each user to one logic resource element group and subjecting groups of data symbols mapped to an identical logic resource element group to a multiple-user multiplexing treatment.

In a possible embodiment of the present disclosure, prior to the step of classifying, by the transmission device, the data symbols for each scheduled user into groups based on the logic resource element groups determined based on the encoding matrices each multiplexed by the multiple users, the data transmission method further includes setting, by the transmission device, the encoding matrices and the mapping mode for the reception device.

In another aspect, the present disclosure provides in some embodiments a data transmission method, including steps of: inverse-mapping, by a reception device, a physical resource block carrying user data in accordance with a mapping mode, to determine logic resource element groups; subjecting, by the reception device, the logic resource element groups to an inverse mapping treatment to determine the user data; and decoding, by the reception device, the user data in accordance with encoding matrices each multiplexed by multiple users, to determine data symbols for at least one user.

In a possible embodiment of the present disclosure, the step of inverse-mapping, by the reception device, the physical resource block carrying the user data in accordance with the mapping mode to determine the logic resource element groups includes: inverse-mapping, by the reception device, the physical resource block to determine a logic resource block and inverse-mapping the logic resource block to determine the logic resource element groups in accordance with the mapping mode; or inverse-mapping, by the reception device, the physical resource block in accordance with the mapping mode to directly determine the logic resource element groups.

In a possible embodiment of the present disclosure, the step of inverse-mapping, by the reception device, the logic resource block to determine the logic resource element groups in accordance with the mapping mode includes: inverse-mapping, by the reception device, the logic resource block in a time-domain-before-frequency-domain or frequency-domain-before-time-domain order, to determine the logic resource element groups; or inverse-mapping, by the reception device, the logic resource block to determine interleaved logic resource element groups, and de-interleaving the interleaved logic resource element groups to determine the logic resource element groups.

In a possible embodiment of the present disclosure, the step of inverse-mapping, by the reception device, the physical resource block in accordance with the mapping mode to directly determine the logic resource element groups includes: inverse-mapping, by the reception device, the physical resource block in a time-domain-before-frequency-domain or frequency-domain-before-time-domain order, to determine the logic resource element groups; or inverse-mapping, by the reception device, the physical resource block to determine interleaved logic resource element groups, and de-interleaving the interleaved logic resource element groups to determine the logic resource element groups; or inverse-mapping, by the reception device, the physical resource block to determine logic resource element groups acquired after an inter-group frequency-hopping treatment, and determining the logic resource element groups based on an inter-group frequency-hopping position and the logic resource element groups acquired after the inter-group frequency-hopping treatment.

In yet another aspect, the present disclosure provides in some embodiments a transmission device for data transmission, including: a processor, a memory, connected to the processor via a bus interface and configured to store therein programs and data used for operation of the processor, and a transceiver, connected to the processor and the memory via the bus interface, and configured to receive and transmit data under control of the processor. The processor is configured to call and execute the programs and data stored in the memory to: classify data symbols for each scheduled user into groups based on logic resource element groups determined based on encoding matrices each multiplexed by multiple users; encode respective groups of data symbols for each user in accordance with the encoding matrices, to determine groups of encoded data symbols for each user; subject respective groups of encoded data symbols for each user to a mapping treatment based on logic resource elements; map respective logic resource element groups to a physical resource block in accordance with a mapping mode; and transmit data, via the transceiver, to a reception device based on the physical resource block.

In a possible embodiment of the present disclosure, the processor is configured to call and execute the programs and data stored in the memory to determine resource elements corresponding to each encoding matrix multiplexed by the multiple users as one logic resource element group.

In a possible embodiment of the present disclosure, the processor is configured to call and execute the programs and data stored in the memory to: map the respective logic resource element groups to a logic resource block and map the logic resource block to the physical resource block in accordance with the mapping mode; or map the respective logic resource element groups directly to the physical resource block in accordance with the mapping mode.

In a possible embodiment of the present disclosure, in the case of mapping the respective logic resource element groups to the logic resource block and mapping the logic resource block to the physical resource block in accordance with the mapping mode, the processor is configured to call and execute the programs and data stored in the memory to: map the logic resource element groups to the logic resource block in a time-domain-before-frequency-domain or frequency-domain-before-time-domain order; or interleave the logic resource element groups, and then map the interleaved logic resource element groups to the logic resource block.

In a possible embodiment of the present disclosure, in the case of mapping the respective logic resource element groups directly to the physical resource block in accordance with the mapping mode, the processor is configured to call and execute the programs and data stored in the memory to:

map the logic resource element groups to the physical resource block in a time-domain-before-frequency-domain or frequency-domain-before-time-domain order; or interleave the logic resource element groups and then map the interleaved logic resource element groups to the physical resource block; or subject the logic resource element groups to an inter-group frequency-hopping treatment and then map resultant logic resource element groups to the physical resource block.

In a possible embodiment of the present disclosure, the transmission device is a UE, and the reception device is a network side device. The processor is configured to call and execute the programs and data stored in the memory to map the groups of encoded data symbols for each user to different logic resource element groups respectively.

In a possible embodiment of the present disclosure, the processor is further configured to call and execute the programs and data stored in the memory to receive the encoding matrices and/or the mapping mode set by the network side device.

In a possible embodiment of the present disclosure, the transmission device is a network side device, and the reception device is a UE. The processor is further configured to call and execute the programs and data stored in the memory to map each group of encoded data symbols for each user to one logic resource element group and subject groups of data symbols mapped to an identical logic resource element group to a multiple-user multiplexing treatment.

In a possible embodiment of the present disclosure, the processor is further configured to call and execute the programs and data stored in the memory to set the encoding matrices and the mapping mode for the reception device.

In still yet another aspect, the present disclosure provides in some embodiments a reception device for data transmission, including: a processor, a memory, connected to the processor via a bus interface and configured to store therein programs and data used for operation of the processor, and a transceiver, connected to the processor and the memory via the bus interface, and configured to receive and transmit data under control of the processor. The processor is configured to call and execute the programs and data stored in the memory to: inverse-map a physical resource block carrying user data in accordance with a mapping mode, to determine logic resource element groups; subject the logic resource element groups to an inverse mapping treatment to determine the user data; and decode the user data in accordance with encoding matrices each multiplexed by multiple users, to determine data symbols for at least one user.

In a possible embodiment of the present disclosure, the processor is configured to call and execute programs and data stored in the memory to: inverse-map the physical resource block to determine a logic resource block and inverse-map the logic resource block to determine the logic resource element groups in accordance with the mapping mode; or inverse-map the physical resource block in accordance with the mapping mode to directly determine the logic resource element groups.

In a possible embodiment of the present disclosure, in the case of inverse-mapping the logic resource block to determine the logic resource element groups in accordance with the mapping mode, the processor is configured to call and execute programs and data stored in the memory to: inverse-map the logic resource block in a time-domain-before-frequency-domain or frequency-domain-before-time-domain order, to determine the logic resource element groups; or inverse-map the logic resource block to determine interleaved logic resource element groups, and de-interleave the interleaved logic resource element groups to determine the logic resource element groups.

In a possible embodiment of the present disclosure, in the case of inverse-mapping the physical resource block in accordance with the mapping mode to directly determine the logic resource element groups, the processor is configured to call and execute programs and data stored in the memory to: inverse-map the physical resource block in a time-domain-before-frequency-domain or frequency-domain-before-time-domain order, to determine the logic resource element groups; or inverse-map the physical resource block to determine interleaved logic resource element groups, and de-interleave the interleaved logic resource element groups to determine the logic resource element groups; or inverse-map the physical resource block to determine logic resource element groups acquired after an inter-group frequency-hopping treatment, and determine the logic resource element groups based on an inter-group frequency-hopping position and the logic resource element groups acquired after the inter-group frequency-hopping treatment.

According to the embodiments of the present disclosure, the logic resource element groups may be determined based on the encoding matrices each multiplexed by multiple users, respective logic resource element groups may be mapped to the physical resource block in accordance with the mapping mode, and the data may be transmitted to the reception device based on the physical resource block. As a result, it is able to perform resource mapping in a non-orthogonal access mode and to improve the resource utilization.

DETAILED DESCRIPTION OF THE EMBODIMENTS

According to the embodiments of the present disclosure, a transmission device may classify data symbols for each scheduled user in accordance with logic resource element groups determined by encoding matrices each multiplexed by multiple users, encode groups of data symbols for each user in accordance with the encoding matrices so as to determine groups of encoded data symbols for each user, subject respective groups of encoded data symbols for each user to mapping treatment based on logic resource elements, map each logic resource element group to a physical resource block in accordance with a mapping mode, and transmit data to a reception device based on the physical resource block. The logic resource element groups may be determined in accordance with the encoding matrices each multiplexed by multiple users, each logic resource element group may be mapped to the physical resource block in accordance with the mapping mode, and the data may be transmitted to the reception device based on the physical resource block; hence, it is able to perform resource mapping in case of non-orthogonal access and improve resource utilization.

The present disclosure will be described hereinafter in conjunction with the drawings and embodiments.

Figure 1A:
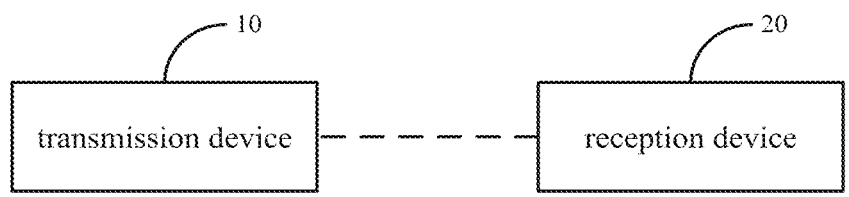
FIG. 1A is a schematic view showing a data transmission system according to a first embodiment of the present disclosure.

As shown in FIG. 1A, the present disclosure provides in a first embodiment a data transmission system, including a transmission device 10 and a reception device 20. The transmission device 10 is configured to: classify data symbols for each scheduled user in accordance with logic resource element groups determined by encoding matrices each multiplexed by multiple users, encode groups of data symbols for each user in accordance with the encoding matrices so as to determine groups of encoded data symbols for each user, subject respective groups of encoded data symbols for each user to mapping treatment based on logic resource elements, map each logic resource element group to a physical resource block in accordance with a mapping mode, and transmit data to a reception device based on the physical resource block. The reception device 20 is configured to: inverse-map the physical resource block carrying user data in accordance with the mapping mode so as to determine the logic resource element groups, subject the logic resource element groups to inverse-mapping treatment to determine the user data, and decode the user data based on the encoding matrices each multiplexed by multiple users to determine the data symbols for at least one user.

Here, determination of each logic resource element group actually refers to determination of positions of resources forming the logic resource element group.

During the implementation, data symbols for each scheduled user may be data symbols for each user scheduled through Medium Access Control (MAC).

For uplink transmission, the transmission device is a UE and the reception device is a network side device; for the downlink transmission, the transmission device is a network side device and the reception device is a UE.

In the embodiments of the present disclosure, the network side device may be a base station (e.g., a macro base station or Femtocell), or a relay node (RN) device, or any other network side device.

Detailed descriptions of downlink transmission and uplink transmission will be given as follows.

1. Downlink Transmission

During the implementation, the transmission device may select an encoding matrix multiplexed by multiple users in accordance with a channel condition that is reported by the multiple users or acquired through an uplink pilot and reciprocity, and notify the reception device of the encoding matrix.

For example, in the case that N=3 resource elements are multiplexed by 7 users, the following encoding matrix may be adopted:

$$C_{PDMA}^{(3,7)} = \begin{bmatrix} 1 & 1 & 1 & 0 & 1 & 0 & 0 \\ 1 & 1 & 0 & 1 & 0 & 1 & 0 \\ 1 & 0 & 1 & 1 & 0 & 0 & 1 \end{bmatrix}_{3 \times 7}.$$

A resource element group may be adjusted and stipulated based on the channel condition, encoding complexity and overhead. For example, in the case that the number of resource elements in the resource element group is 4 and the number of users is 8, the following encoding matrix may be adopted:

$$H_{PDMA}^{(4,8)} = \begin{bmatrix} 1 & 1 & 1 & 0 & 1 & 0 & 0 & 0 \\ 1 & 1 & 1 & 0 & 0 & 1 & 0 & 0 \\ 1 & 1 & 0 & 1 & 0 & 0 & 1 & 0 \\ 1 & 0 & 0 & 1 & 0 & 0 & 0 & 1 \end{bmatrix}_{4 \times 8}.$$

It should be appreciated that, the above-mentioned encoding matrices are for illustrative purposes only but shall not be used to limit the scope of the present disclosure, i.e., any other encoding matrices may also be used. In addition, in the case of N=3 resource elements multiplexed by 7 users, an encoding matrix different from that mentioned above may also be used. Identically, in the case of N=4 resource elements multiplexed by 8 users, an encoding matrix different from that mentioned above may also be used. The encoding matrix may depend on the number of the resource elements and the number of the users.

The transmission device may determine the resource elements corresponding to the encoding matrix multiplexed by the multiple users as one logic resource element group.

Figure 1B:
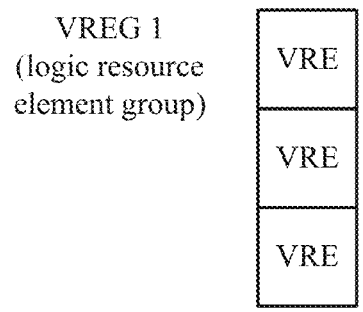
FIG. 1B is a schematic view showing a logic resource element group according to an embodiment of the present disclosure.

For example, in the case that the encoding matrix corresponds to 3 resource elements (REs), these 3 resource elements may be determined as one element group VREG1, as shown in FIG. 1B.

In the case of subjecting each group of encoded data symbols for each user after data symbol encoding to a mapping treatment based on logic resource elements, the transmission device may map each group of encoded data symbols for each user to one logic resource element group, and subject groups of encoded data symbols mapped to an identical logic resource element group to a multiple-user multiplexing treatment.

To be specific, the transmission device may classify data symbols for each scheduled user into groups based on logic resource element groups, and each group of data symbols corresponds to one logic resource element group. Multiple users may each have one group of data symbols that correspond to an identical logic resource element group.

Upon encoding the data symbols in accordance with predetermined encoding matrices, the transmission device may map each group of encoded data symbols to a logic resource element group, and subject groups of encoded data symbols mapped to an identical logic resource element group to the multiple-user multiplexing treatment.

Figure 1C:
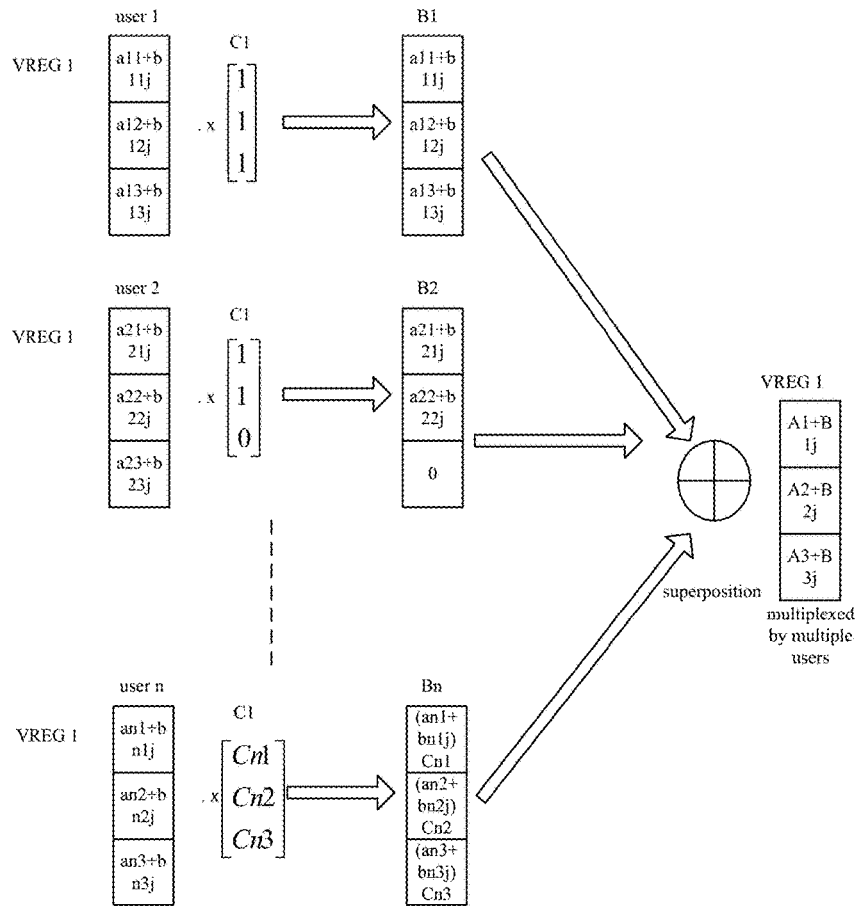
FIG. 1C is a schematic view showing data mapping and encoding for logic resource element groups according to an embodiment of the present disclosure.

For example, a group n of data symbols for a user n is $An=[an1+bn1j, an2+bn2j, an3+bn3j]$; and a group of encoded symbols for the user n, mapped to VREGn, is $Bn=An.*[Cn1,Cn2,Cn3]'$, as shown in FIG. 1C.

In a possible embodiment of the present disclosure, the transmission device may use different encoding rates in accordance with channel states of the users, and the encoding rate refers to the number of element "1" in a column vector corresponding to each user in the encoding matrix. For example, in the case that there are 3 resource elements in the resource element group, a peripheral user may use $[1,1,1]'$, while a central user may use $[1,0,0]'$. In the case that there are 4 resource elements in the resource element group, the peripheral user may use $[1,1,1,1]'$, while the central user may use $[1,0,0,0]'$. The selection of non-orthogonal codewords depends on the network side device.

It should be appreciated that, apart from a geographical position, the peripheral user and the central user may also be determined based on a Signal-to-Interference Noise Ratio (SINR), priority levels of the users and priority levels of services of the users.

During the implementation, the transmission device may map each logic resource element group to a physical resource block in various mapping modes, some of which will be described hereinafter.

Mapping mode 1: the transmission device may map each logic resource element group to a logic resource block and map the logic resource block to a physical resource block, in accordance with the mapping mode. Correspondingly, the reception device may, in accordance with the mapping mode, inverse-map the physical resource block to determine the logic resource block and inverse-map the logic resource block to determine the logic resource element group.

A way for mapping the logic resource block to the physical resource block is identical to a known mapping and frequency-hopping way for a Long Term Evolution (LTE) system.

In a possible embodiment of the present disclosure, the number of REs in each logic resource element group is a factor of the number of REs in one logic resource block.

The logic resource block may carry the logic resource element group and the number of REs in the resource element group is a factor of the number of REs in one logic resource block, such that the number of the REs in the logic resource block may be an integral multiple of the number of the REs in the logic resource element group.

The mapping mode 1 may include two types.

Figure 1D:
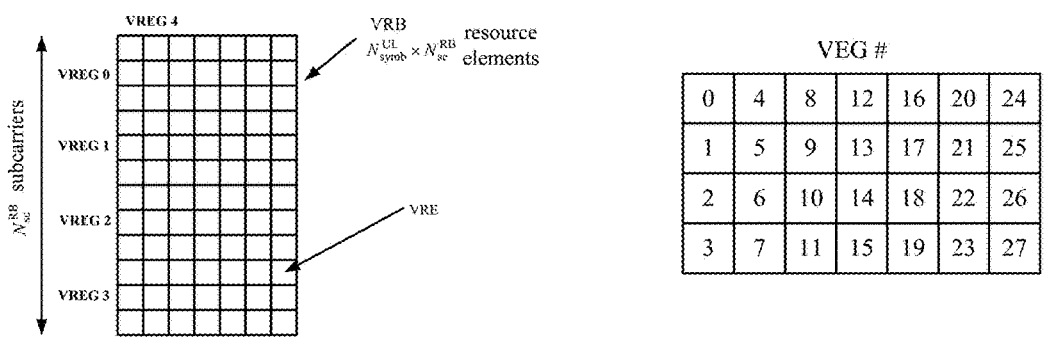
FIG. 1D is a schematic view showing mapping of the logic resource element groups to a logic resource block according to an embodiment of the present disclosure.

For type 1, the transmission device may map logic resource element groups to a logic resource block in a time-domain-before-frequency-domain or frequency-domain-before-time-domain order, as shown in FIG. 1D. Correspondingly, the reception device may inverse-map the logic resource block in the time-domain-before-frequency-domain or frequency-domain-before-time-domain order, so as to determine the logic resource element groups.

It should be appreciated that, FIG. 1D illustrates a mapping mode in which reference symbols are not taken into consideration, and in the case that the reference symbols exist, the reference symbols may not be used to transmit data.

Figures 1E, 1F:
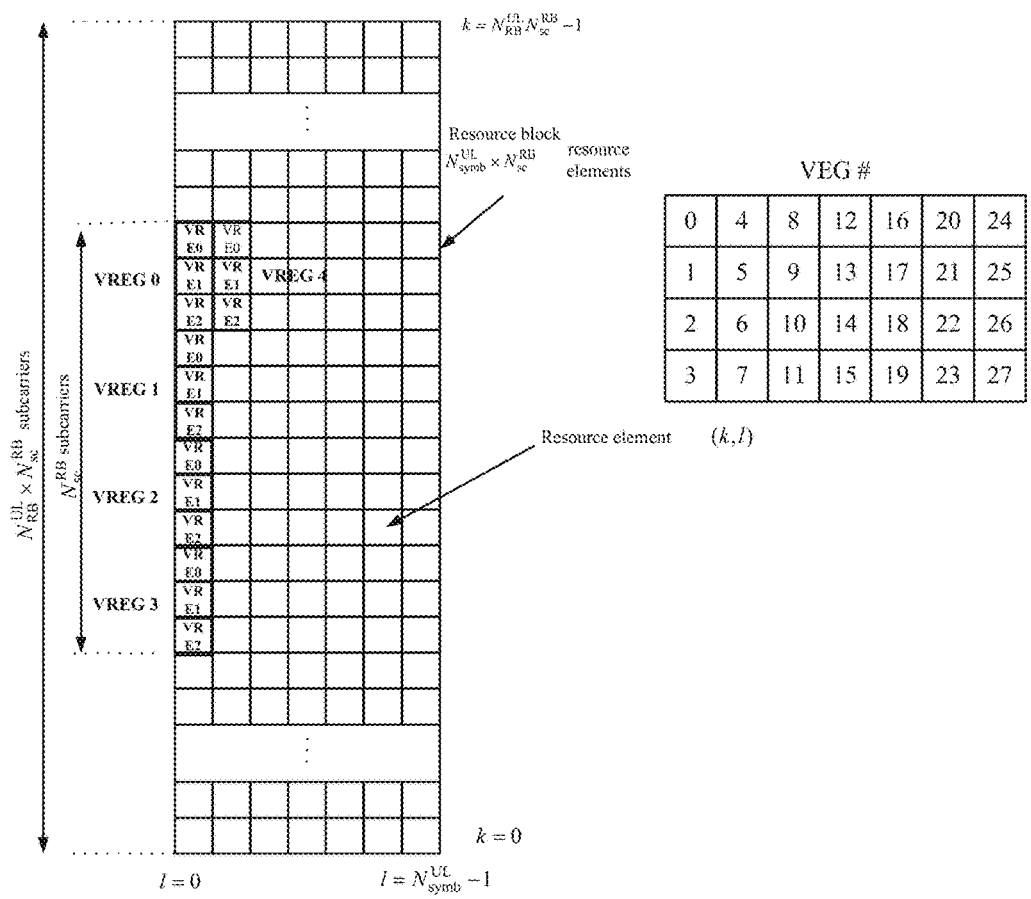
FIG. 1E is a schematic view showing mapping of interleaved logic resource element groups to a logic resource block according to an embodiment of the present disclosure.
FIG. 1F is a schematic view showing mapping of logic resource element groups to a physical resource block according to an embodiment of the present disclosure.

For type 2, the transmission device may interleave respective logic resource element groups, and then map the interleaved logic resource element groups to a logic resource block, as shown in FIG. 1E. Correspondingly, the reception device may inverse-map the logic resource block to determine the interleaved logic resource element groups, and de-interleave the interleaved logic resource element groups so as to determine the respective logic resource element groups.

Interleaving and de-interleaving procedures may refer to $3^{rd}$-Generation Partnership Project (3GPP) Technical Specification (TS) 36.212 and 36.213, and thus will not be particularly defined herein.

Mapping mode 2: the transmission device may directly map each logic resource element group to a physical resource block in accordance with the mapping mode. Correspondingly, the reception device may inverse-map the physical resource block in accordance with the mapping mode, so as to directly determine the logic resource element groups.

In a possible embodiment of the present disclosure, the number of the REs in each logic resource element group is a factor of the number of the REs in all physical resource blocks.

The mapping mode 2 includes three types.

For type 1, the transmission device may map logic resource element groups to a physical resource block in a time-domain-before-frequency-domain or frequency-domain-before-time-domain order, as shown in FIG. 1F. Correspondingly, the reception device may inverse-map the physical resource block in the time-domain-before-frequency-domain or frequency-domain-before-time-domain order, so as to determine the logic resource element groups.

For type 2, the transmission device may interleave respective logic resource element groups, and map the interleaved logic resource element groups to the physical resource block, as shown in FIG. 1E. Correspondingly, the reception device may inverse-map the physical resource block so as to determine the interleaved logic resource element groups, and de-interleave the interleaved logic resource element groups so as to determine the respective logic resource element groups.

The interleaving and de-interleaving procedures may refer to 3GPP TS 36.212 and 36.213, and thus will not be particularly defined herein.

For type 3, the transmission device may subject respective logic resource element groups to inter-group frequency-hopping treatment, and then map the logic resource element groups to a physical resource block.

In a possible embodiment of the present disclosure, the frequency-hopping treatment may be performed subsequent to or together with the interleaving procedure, or it may be performed without any interleaving procedure.

Figure 1G:
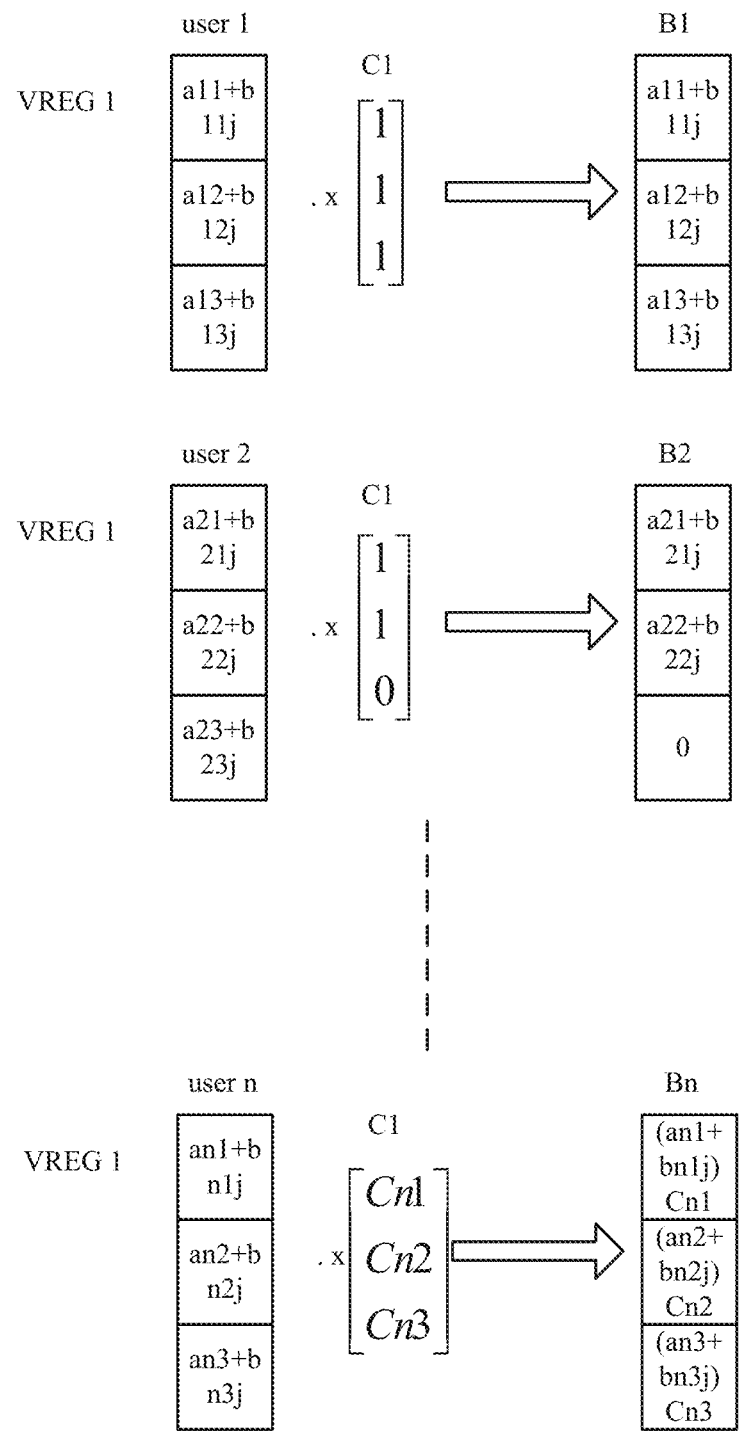
FIG. 1G is a schematic view showing data mapping and encoding for logic resource element groups according to an embodiment of the present disclosure.
Figures 1H, 1I, 2:
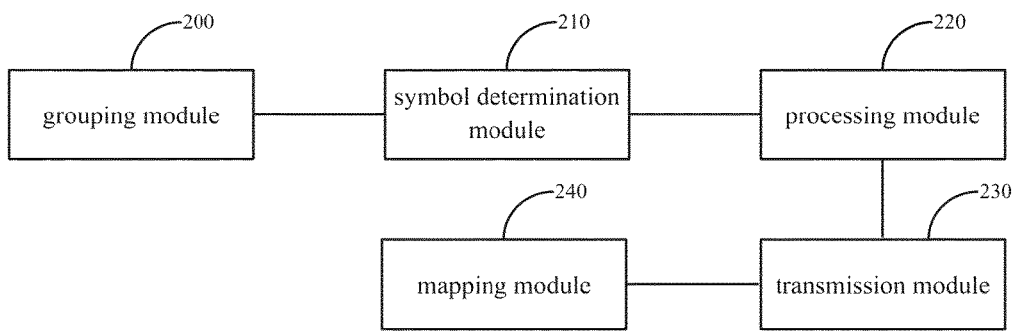
FIG. 1H is a schematic view showing inter-group frequency-hopping according to an embodiment of the present disclosure.
FIG. 1I is a schematic view showing inter-group frequency-hopping according to an embodiment of the present disclosure.
FIG. 2 is a schematic view showing a transmission device according to a second embodiment of the present disclosure.

1) In the case that the frequency-hopping treatment is performed subsequent to the interleaving procedure, each VEG may be subjected to the frequency-hopping treatment by a fixed distance G=2 per time slot, as shown in FIG. 1H. In other words, there are 3REs in each logic resource element group, the respective logic resource element groups are interleaved and then subjected to the frequency-hopping treatment by a fixed distance. The fixed distance may be configured at a network side and then notified to a terminal.

In the case of inverse-mapping, the terminal may acquire a position of each logic resource element group in accordance with the fixed distance.

2) In the case that the frequency-hopping treatment is performed without any interleaving procedure, each VEG may be subjected to the frequency-hopping treatment by a fixed distance G=2 per time slot, as shown in FIG. 1I. In other words, there are 3REs in each logic resource element group, and the respective logic resource element groups are subjected to the frequency-hopping treatment by a fixed distance without any interleaving procedure in advance. The fixed distance may be configured at a network side and then notified to a terminal. In the case of inverse-mapping, the terminal may acquire a position of each logic resource element group in accordance with the fixed distance.

In the case of determining the frequency-hopping distance, the frequency-hopping distance may be a factor of the number of logic resource element groups of a logic resource block in frequency domain, so as to ensure the logic resource element groups have an identical frequency-hopping distance in any scenarios.

The logic resource after the inter-group frequency-hopping treatment may be mapped to physical resource based on an RE mapping mode specified in the known LTE protocol, and a frequency-hopping mode may be that specified in 3GPP TS 36.213.

During the implementation, the transmission device may configure the encoding matrices and the mapping mode for the reception device. Correspondingly, the reception device may inverse-map the physical resource block so as to determine the logic resource element groups processed by the inter-group frequency-hopping treatment, and then determine the logic resource element groups based on an inter-group frequency-hopping position.

In a possible embodiment of the present disclosure, prior to classifying data symbols for each scheduled user into groups in accordance with logic resource element groups determined by encoding matrices each multiplexed by multiple users, the transmission device may configure the encoding matrices and the mapping mode for the reception device. Correspondingly, the reception device may receive data in accordance with the encoding matrices and the mapping mode configured by the transmission device.

2. Uplink Transmission

During the implementation, the reception device may select an encoding matrix multiplexed by multiple users in accordance with a channel condition that is reported by the multiple users or acquired through an uplink pilot and reciprocity, and notify the transmission device of the encoding matrix.

For example, in the case that N=3 resource elements are multiplexed by 7 users, the following encoding matrix may be adopted:

$$C_{PDMA}^{(3,7)} = \begin{bmatrix} 1 & 1 & 1 & 0 & 1 & 0 & 0 \\ 1 & 1 & 0 & 1 & 0 & 1 & 0 \\ 1 & 0 & 1 & 1 & 0 & 0 & 1 \end{bmatrix}_{3 \times 7}.$$

A resource element group may be adjusted and stipulated based on the channel condition, encoding complexity and overhead. For example, in the case that the number of resource elements in the resource element group is 4 and the number of users is 8, the following encoding matrix may be adopted:

$$H_{PDMA}^{(4,8)} = \begin{bmatrix} 1 & 1 & 1 & 0 & 1 & 0 & 0 & 0 \\ 1 & 1 & 1 & 0 & 0 & 1 & 0 & 0 \\ 1 & 1 & 0 & 1 & 0 & 0 & 1 & 0 \\ 1 & 0 & 0 & 1 & 0 & 0 & 0 & 1 \end{bmatrix}_{4 \times 8}.$$

It should be appreciated that, the above-mentioned encoding matrices are for illustrative purposes only but shall not be used to limit the scope of the present disclosure, i.e., any other encoding matrices may also be used. In addition, in the case of N=3 resource elements multiplexed by 7 users, an encoding matrix different from that mentioned above may also be used. Identically, in the case of N=4 resource elements multiplexed by 8 users, an encoding matrix different from that mentioned above may also be used. The encoding matrix may depend on the number of the resource elements and the number of the users.

The transmission device may determine the resource elements corresponding to the encoding matrix multiplexed by the multiple users as one logic resource element group.

For example, in the case that the encoding matrix corresponds to 3 resource elements (REs), these 3 resource elements may be determined as one element group VREG1, as shown in FIG. 1B.

In the case of subjecting each group of encoded data symbols for each user after data symbol encoding to a mapping treatment based on logic resource elements, the transmission device may map each group of encoded data symbols for each user to one logic resource element group, and subject groups of encoded data symbols mapped to an identical logic resource element group to a multiple-user multiplexing treatment.

To be specific, the transmission device may classify data symbols for each scheduled user into groups based on logic resource element groups, and each group of data symbols corresponds to one logic resource element group. Each logic resource element group may correspond to merely one group of data symbols for each user.

Upon encoding the data symbols in accordance with predetermined encoding matrices, the transmission device may map each group of encoded data symbols to a logic resource element group.

For example, a group n of data symbols for a user n is An=[an1+bn1j, an2+bn2j, an3+bn3j]; and a group of encoded symbols for the user n, mapped to VREGn, is Bn=An.*[Cn1,Cn2,Cn3]', as shown in FIG. 1G.

In a possible embodiment of the present disclosure, the transmission device may use different encoding rates in accordance with channel states of the users, and the encoding rate refers to the number of element "1" in a column vector corresponding to each user in the encoding matrix. For example, in the case that there are 3 resource elements in the resource element group, a peripheral user may use [1,1,1]', while a central user may use [1,0,0]'. In the case that there are 4 resource elements in the resource element group, the peripheral user may use [1,1,1,1]', while the central user may use [1,0,0,0]'.

It should be appreciated that, apart from a geographical position, the peripheral user and the central user may also be determined based on SINR, priority levels of the users and priority levels of services of the users.

During the implementation, the transmission device may map each logic resource element group to a physical resource block in various mapping modes, some of which will be described hereinafter.

Mapping mode 1: the transmission device may map each logic resource element group to a logic resource block and map the logic resource block to a physical resource block, in accordance with the mapping mode. Correspondingly, the reception device may, in accordance with the mapping mode, inverse-map the physical resource block to determine the logic resource block and inverse-map the logic resource block to determine the logic resource element group.

A way for mapping the logic resource block to the physical resource block is identical to a known mapping and frequency-hopping way for an LTE system.

In a possible embodiment of the present disclosure, the number of REs in each logic resource element group is a factor of the number of REs in one logic resource block.

The logic resource block may carry the logic resource element group and the number of REs in the resource element group is a factor of the number of REs in one logic resource block, such that the number of the REs in the logic resource block may be an integral multiple of the number of the REs in the logic resource element group.

The mapping mode 1 may include two types.

For type 1, the transmission device may map logic resource element groups to a logic resource block in a time-domain-before-frequency-domain or frequency-domain-before-time-domain order, as shown in FIG. 1D. Correspondingly, the reception device may inverse-map the logic resource block in the time-domain-before-frequency-domain or frequency-domain-before-time-domain order, so as to determine the logic resource element groups.

It should be appreciated that, FIG. 1D illustrates a mapping mode in which reference symbols are not taken into consideration, and in the case that the reference symbols exist, the reference symbols may not be used to transmit data.

For type 2, the transmission device may interleave respective logic resource element groups, and then map the interleaved logic resource element groups to a logic resource block, as shown in FIG. 1E. Correspondingly, the reception device may inverse-map the logic resource block to determine the interleaved logic resource element groups, and de-interleave the interleaved logic resource element groups so as to determine the respective logic resource element groups.

Interleaving and de-interleaving procedures may refer to 3 GPP TS 36.212 and 36.213, and thus will not be particularly defined herein.

Mapping mode 2: the transmission device may directly map each logic resource element group to a physical resource block in accordance with the mapping mode. Correspondingly, the reception device may inverse-map the physical resource block in accordance with the mapping mode, so as to directly determine the logic resource element groups.

In a possible embodiment of the present disclosure, the number of the REs in each logic resource element group is a factor of the number of the REs in all physical resource blocks.

The mapping mode 2 includes three types.

For type 1, the transmission device may map logic resource element groups to a physical resource block in a time-domain-before-frequency-domain or frequency-domain-before-time-domain order, as shown in FIG. 1F. Correspondingly, the reception device may inverse-map the physical resource block in the time-domain-before-frequency-domain or frequency-domain-before-time-domain order, so as to determine the logic resource element groups.

For type 2, the transmission device may interleave respective logic resource element groups, and map the interleaved logic resource element groups to the physical resource block, as shown in FIG. 1E. Correspondingly, the reception device may inverse-map the physical resource block so as to determine the interleaved logic resource element groups, and de-interleave the interleaved logic resource element groups so as to determine the respective logic resource element groups.

The interleaving and de-interleaving procedures may refer to 3GPP TS 36.212 and 36.213, and thus will not be particularly defined herein.

For type 3, the transmission device may subject respective logic resource element groups to inter-group frequency-hopping treatment, and then map the logic resource element groups to a physical resource block.

In a possible embodiment of the present disclosure, the frequency-hopping treatment may be performed subsequent to or together with the interleaving procedure, or it may be performed without any interleaving procedure.

1) In the case that the frequency-hopping treatment is performed subsequent to the interleaving procedure, each VEG may be subjected to the frequency-hopping treatment by a fixed distance G=2 per time slot, as shown in FIG. 1H. In other words, there are 3REs in each logic resource element group, the respective logic resource element groups are interleaved and then subjected to the frequency-hopping treatment by a fixed distance. The fixed distance may be configured at a network side and then notified to a terminal. In the case of inverse-mapping, the terminal may acquire a position of each logic resource element group in accordance with the fixed distance.

2) In the case that the frequency-hopping treatment is performed without any interleaving procedure, each VEG may be subjected to the frequency-hopping treatment by a fixed distance G=2 per time slot, as shown in FIG. 1I. In other words, there are 3REs in each logic resource element group, and the respective logic resource element groups are subjected to the frequency-hopping treatment by a fixed distance without any interleaving procedure in advance. The fixed distance may be configured at a network side and then notified to a terminal. In the case of inverse-mapping, the terminal may acquire a position of each logic resource element group in accordance with the fixed distance.

In the case of determining the frequency-hopping distance, the frequency-hopping distance may be a factor of the number of logic resource element groups of a logic resource block in frequency domain, so as to ensure the logic resource element groups have an identical frequency-hopping distance in any scenarios.

The logic resource after the inter-group frequency-hopping treatment may be mapped to physical resource based on an RE mapping mode specified in the known LTE protocol, and a frequency-hopping mode may be that specified in 3GPP TS 36.213.

During the implementation, the transmission device may configure the encoding matrices and the mapping mode for the reception device. Correspondingly, the reception device may inverse-map the physical resource block so as to determine the logic resource element groups processed by the inter-group frequency-hopping treatment, and then determine the logic resource element groups based on an inter-group frequency-hopping position.

In a possible embodiment of the present disclosure, before the transmission device classifies data symbols for each scheduled user into groups in accordance with logic resource element groups determined by encoding matrices each multiplexed by multiple users, the reception device may set the encoding matrices and the mapping mode for the transmission device. Correspondingly, the transmission device may receive data in accordance with the encoding matrices and the mapping mode set by the reception device.

As shown in FIG. 2, the present disclosure provides in a second embodiment a transmission device including a grouping module 200, a symbol determination module 210, a processing module 220, a mapping module 230 and a transmission module 240. The grouping module 200 is configured to classify data symbols for each scheduled user into groups based on logic resource element groups determined based on encoding matrices each multiplexed by multiple users. The symbol determination module 210 is configured to encode respective groups of data symbols for each user in accordance with the encoding matrices, so as to determine groups of encoded data symbols for each user. The processing module 220 is configured to subject the respective groups of encoded data symbols for each user to mapping treatment based on logic resource elements. The mapping module 230 is configured to map respective logic resource element groups to a physical resource block in accordance with a mapping mode. The transmission module 240 is configured to transmit data to a reception device based on the physical resource block.

In a possible embodiment of the present disclosure, the grouping module 200 is configured to determine resource elements corresponding to each encoding matrix multiplexed by multiple users as one logic resource element group.

In a possible embodiment of the present disclosure, the mapping module 230 is configured to: map the respective logic resource element groups to a logic resource block and map the logic resource block to the physical resource block in accordance with the mapping mode; or map the respective logic resource element groups directly to the physical resource block in accordance with the mapping mode.

In a possible embodiment of the present disclosure, in the case of mapping the respective logic resource element groups to the logic resource block and mapping the logic resource block to the physical resource, the mapping module 230 is configured to: map the logic resource element groups to the logic resource block in a time-domain-before-frequency-domain or frequency-domain-before-time-domain order; or interleave the logic resource element groups, and then map the interleaved logic resource element groups to the logic resource block.

In a possible embodiment of the present disclosure, in the case of mapping the respective logic resource element groups directly to the physical resource block in accordance with the mapping mode, the mapping module 230 is configured to: map the logic resource element groups to the physical resource block in a time-domain-before-frequency-domain or frequency-domain-before-time-domain order; or interleave the logic resource element groups and then map the interleaved logic resource element groups to the physical resource block; or subject the logic resource element groups to inter-group frequency-hopping treatment and then map the resultant logic resource element groups to the physical resource block.

In a possible embodiment of the present disclosure, the transmission device is a UE, and the reception device is a network side device. The processing module 220 is further configured to map the groups of encoded data symbols for each user to different logic resource element groups respectively.

In a possible embodiment of the present disclosure, the grouping module 200 is further configured to receive the encoding matrices and/or the mapping mode set by the network side device.

In a possible embodiment of the present disclosure, the transmission device is a network side device, and the reception device is a UE. The processing module 220 is further configured to map each group of encoded data symbols for each user to one logic resource element group and subject groups of encoded data symbols mapped to an identical logic resource element group to a multiple-user multiplexing treatment.

In a possible embodiment of the present disclosure, the grouping module 200 is further configured to set the encoding matrices and the mapping mode for the reception device.

Figure 3:
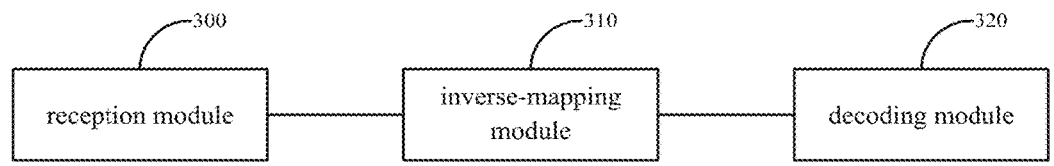
FIG. 3 is a schematic view showing a reception device according to a third embodiment of the present disclosure.

As shown in FIG. 3, the present disclosure further provides in a third embodiment a reception device including a reception module 300, an inverse-mapping module 310 and a decoding module 320. The reception module 300 is configured to inverse-map a physical resource block carrying user data in accordance with a mapping mode, so as to determine logic resource element groups. The inverse-mapping module 310 is configured to subject the logic resource element groups to inverse mapping treatment so as to determine the user data. The decoding module 320 is configured to decode the user data in accordance with encoding matrices each multiplexed by multiple users, so as to determine data symbols for at least one user.

In a possible embodiment of the present disclosure, the reception module 300 is configured to: inverse-map the physical resource block to determine a logic resource block and inverse-map the logic resource block to determine the logic resource element groups in accordance with the mapping mode; or inverse-map the physical resource block in accordance with the mapping mode so as to directly determine the logic resource element groups.

In a possible embodiment of the present disclosure, in the case of inverse-mapping the logic resource block to determine the logic resource element groups in accordance with the mapping mode, the reception module 300 is configured to: inverse-map the logic resource block in a time-domain-before-frequency-domain or frequency-domain-before-time-domain order, so as to determine the logic resource element groups; or inverse-map the logic resource block so as to determine interleaved logic resource element groups, and de-interleave the interleaved logic resource element groups to determine the logic resource element groups.

In a possible embodiment of the present disclosure, in the case of inverse-mapping the physical resource block in accordance with the mapping mode so as to directly determine the logic resource element groups, the reception module 300 is configured to: inverse-map the physical resource block in a time-domain-before-frequency-domain or frequency-domain-before-time-domain order, so as to determine the logic resource element groups; or inverse-map the physical resource block so as to determine interleaved logic resource element groups, and de-interleave the interleaved logic resource element groups to determine the logic resource element groups; or inverse-map the physical resource block so as to determine logic resource element groups acquired after inter-group frequency-hopping treatment, and determine the logic resource element groups based on an inter-group frequency-hopping position and the logic resource element groups acquired after the inter-group frequency-hopping treatment.

Figure 4:
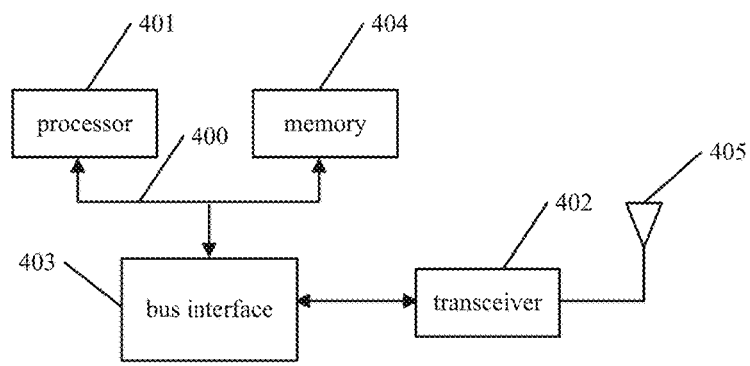
FIG. 4 is a schematic view showing a transmission device according to a fourth embodiment of the present disclosure.

As shown in FIG. 4, the present disclosure further provides in a fourth embodiment a transmission device including a processor 401, a transceiver 402 and a memory 404. The processor 401 is configured to read a program stored in the memory 404, so as to: classify data symbols for each scheduled user into groups based on logic resource element groups determined based on encoding matrices each multiplexed by multiple users; encode respective groups of data symbols for each user in accordance with the encoding matrices, so as to determine groups of encoded data symbols for each user; subject respective groups of encoded data symbols for each user to mapping treatment based on logic resource elements; map respective logic resource element groups to a physical resource block in accordance with a mapping mode; and transmit, through the transceiver 402, data to a reception device based on the physical resource block. The transceiver 402 is configured to receive and transmit data under the control of the processor 401.

In a possible embodiment of the present disclosure, the processor 401 is further configured to determine resource elements corresponding to an encoding matrix multiplexed by multiple users as one logic resource element group.

In a possible embodiment of the present disclosure, the processor 401 is further configured to: map each logic resource element group to a logic resource block and map the logic resource block to the physical resource block in accordance with the mapping mode; or map each logic resource element group directly to the physical resource block in accordance with the mapping mode.

In a possible embodiment of the present disclosure, in the case of mapping each logic resource element group to the logic resource block and mapping the logic resource block to the physical resource, the processor 401 is configured to: map the logic resource element groups to the logic resource block in a time-domain-before-frequency-domain or frequency-domain-before-time-domain order; or interleave the logic resource element groups, and then map the interleaved logic resource element groups to the logic resource block.

In a possible embodiment of the present disclosure, in the case of mapping the respective logic resource element groups directly to the physical resource block in accordance with the mapping mode, the processor 401 is configured to: map the logic resource element groups to the physical resource block in a time-domain-before-frequency-domain or frequency-domain-before-time-domain order; or interleave the logic resource element groups and then map the interleaved logic resource element groups to the physical resource block; or subject the logic resource element groups to inter-group frequency-hopping treatment and then map the resultant logic resource element groups to the physical resource block.

In a possible embodiment of the present disclosure, the transmission device is a UE, and the reception device is a network side device. The processor 401 is further configured to map the groups of encoded data symbols for each user to different logic resource element groups respectively.

In a possible embodiment of the present disclosure, the processor 401 is further configured to receive the encoding matrices and/or the mapping mode set by the network side device.

In a possible embodiment of the present disclosure, the transmission device is a network side device, and the reception device is a UE. The processor 401 is further configured to map each group of encoded data symbols for each user to one logic resource element group and subject groups of encoded data symbols mapped to an identical logic resource element group to a multiple-user multiplexing treatment.

In a possible embodiment of the present disclosure, the processor 401 is further configured to set the encoding matrices and the mapping mode for the reception device.

In FIG. 4, a bus architecture represented by a bus 400 may include a number of buses and bridges connected to each other, so as to connect various circuits for one or more processors 401 and one or more memories 404. In addition, as is known in the art, the bus architecture may be used to connect any other circuits, such as a circuit for a peripheral device, a circuit for a voltage stabilizer and a power management circuit. A bus interface 403 is provided between the bus 400 and the transceiver 402, and the transceiver 402 may consist of one or more elements, i.e., multiple transmitters and multiple receivers for communication with any other devices over a transmission medium. Processed data from the processor 401 is transmitted over a wireless medium through an antenna 405. Further, the antenna 405 is further configured to receive data and transmit the data to the processor 401. The processor 401 may take charge of managing the bus architecture as well as general processings, and may further provide various functions such as timing, peripheral interfacing, voltage adjustment, power source management and any other control functions. The memory 404 may store therein data desired for the operation of the processor 401.

In a possible embodiment of the present disclosure, the processor 401 may be a Central Processing Unit (CPU), an Application Specific Integrated Circuit (ASIC), a Field-Programmable Gate Array (FPGA) or a Complex Programmable Logic Device (CPLD).

Figure 5:
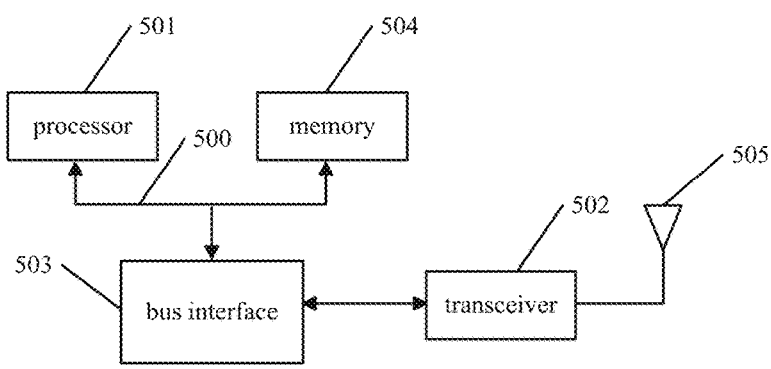
FIG. 5 is a schematic view showing a reception device according to a fifth embodiment of the present disclosure.

As shown in FIG. 5, the present disclosure further provides in a fifth embodiment a reception device including a processor 501, a transceiver 502 and a memory 504. The processor 501 is configured to read a program stored in the memory 504, so as to: inverse-map, through the transceiver 502, a physical resource block carrying user data in accordance with a mapping mode, so as to determine logic resource element groups; subject the logic resource element groups to inverse mapping treatment so as to determine the user data; and decode the user data in accordance with encoding matrices each multiplexed by multiple users, so as to determine data symbols for at least one user. The transceiver 502 is configured to receive and transmit data under the control of the processor 501.

In a possible embodiment of the present disclosure, the processor 501 is further configured to: inverse-map the physical resource block to determine a logic resource block and inverse-map the logic resource block to determine the logic resource element groups in accordance with the mapping mode; or inverse-map the physical resource block in accordance with the mapping mode so as to directly determine the logic resource element groups.

In a possible embodiment of the present disclosure, in the case of inverse-mapping the logic resource block to determine the logic resource element groups in accordance with the mapping mode, the processor 501 is configured to: inverse-map the logic resource block in a time-domain-before-frequency-domain or frequency-domain-before-time-domain order, so as to determine the logic resource element groups; or inverse-map the logic resource block so as to determine interleaved logic resource element groups, and de-interleave the interleaved logic resource element groups to determine the logic resource element groups.

In a possible embodiment of the present disclosure, in the case of inverse-mapping the physical resource blocks in accordance with the mapping mode so as to directly determine the logic resource element groups, the processor 501 is configured to: inverse-map the physical resource block in a time-domain-before-frequency-domain or frequency-domain-before-time-domain order, so as to determine the logic resource element groups; or inverse-map the physical resource block so as to determine interleaved logic resource element groups, and de-interleave the interleaved logic resource element groups to determine the logic resource element groups; or inverse-map the physical resource block so as to determine logic resource element groups acquired after inter-group frequency-hopping treatment, and determine the logic resource element groups based on an inter-group frequency-hopping position and the logic resource element groups acquired after the inter-group frequency-hopping treatment.

In FIG. 5, a bus architecture represented by a bus 500 may include a number of buses and bridges connected to each other, so as to connect various circuits for one or more processors 501 and one or more memories 504. In addition, as is known in the art, the bus architecture may be used to connect any other circuits, such as a circuit for a peripheral device, a circuit for a voltage stabilizer and a power management circuit. A bus interface 503 is provided between the bus 500 and the transceiver 502, and the transceiver 502 may consist of one or more elements, i.e., multiple transmitters and multiple receivers for communication with any other devices over a transmission medium. Processed data from the processor 501 is transmitted over a wireless medium through an antenna 505. Further, the antenna 505 is further configured to receive data and transmit the data to the processor 501. The processor 501 may take charge of managing the bus architecture as well as general processings, and may further provide various functions such as timing, peripheral interfacing, voltage adjustment, power source management and any other control functions. The memory 504 may store therein data desired for the operation of the processor 501.

In a possible embodiment of the present disclosure, the processor 501 may be a CPU, an ASIC, an FPGA or a CPLD.

Based on an identical inventive concept, the present disclosure further provides in some embodiments a data transmission method. The data transmission method may be implemented by the network side device in the above-mentioned data transmission system, and a principle of the data transmission method for solving the problem is identical to that of the network side device. In this regard, the implementation thereof may refer to that device mentioned above and thus will not be particularly defined herein.

Figure 6:
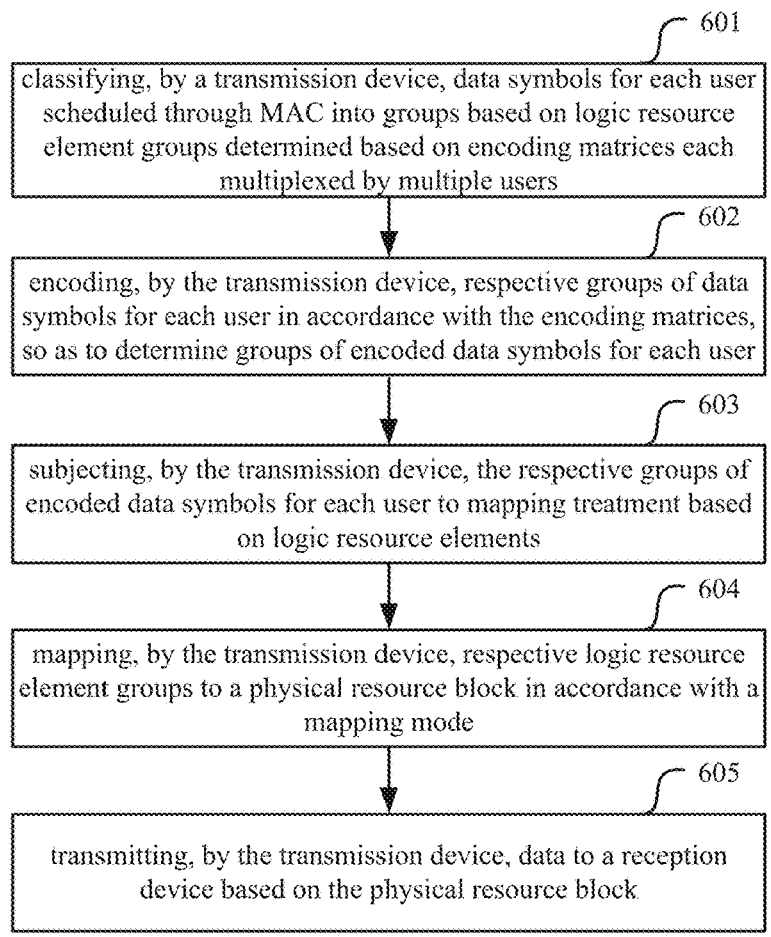
FIG. 6 is a flow chart of a data transmission method according to a sixth embodiment of the present disclosure.

As shown in FIG. 6, the present disclosure further provides in a sixth embodiment a data transmission method which includes: Step 601 of classifying, by a transmission device, data symbols for each scheduled user into groups based on logic resource element groups determined based on encoding matrices each multiplexed by multiple users; Step 602 of encoding, by the transmission device, respective groups of data symbols for each user in accordance with the encoding matrices, so as to determine groups of encoded data symbols for each user; Step 603 of subjecting, by the transmission device, the respective groups of encoded data symbols for each user to mapping treatment based on logic resource elements; Step 604 of mapping, by the transmission device, respective logic resource element groups to a physical resource block in accordance with a mapping mode; and Step 605 of transmitting, by the transmission device, data to a reception device based on the physical resource block.

In a possible embodiment of the present disclosure, resource elements corresponding to each encoding matrix multiplexed by multiple users are determined by the transmission device as one logic resource element group.

In a possible embodiment of the present disclosure, the step of mapping, by the transmission device, the respective logic resource element groups to the physical resource block in accordance with the mapping mode includes: mapping, by the transmission device, the respective logic resource element groups to a logic resource block and mapping the logic resource block to the physical resource block in accordance with the mapping mode; or mapping, by the transmission device, the respective logic resource element groups directly to the physical resource block in accordance with the mapping mode.

In a possible embodiment of the present disclosure, the step of mapping, by the transmission device, the respective logic resource element groups to the logic resource block and mapping the logic resource block to the physical resource block in accordance with the mapping mode includes: mapping, by the transmission device, the logic resource element groups to the logic resource block in a time-domain-before-frequency-domain or frequency-domain-before-time-domain order; or interleaving, by the transmission device, the logic resource element groups, and then mapping the interleaved logic resource element groups to the logic resource block.

In a possible embodiment of the present disclosure, the step of mapping, by the transmission device, the respective logic resource element groups directly to the physical resource block in accordance with the mapping mode includes: mapping, by the transmission device, the logic resource element groups to the physical resource block in a time-domain-before-frequency-domain or frequency-domain-before-time-domain order; or interleaving, by the transmission device, the logic resource element groups and then mapping the interleaved logic resource element groups to the physical resource block; or subjecting, by the transmission device, the logic resource element groups to inter-group frequency-hopping treatment and then mapping the resultant logic resource element groups to the physical resource block.

In a possible embodiment of the present disclosure, the transmission device is a UE, and the reception device is a network side device. The step of subjecting, by the transmission device, the respective groups of encoded data symbols for each user to mapping treatment based on the logic resource elements includes: mapping, by the transmission device, the groups of encoded data symbols for each user to different logic resource element groups respectively.

In a possible embodiment of the present disclosure, prior to the step of classifying, by the transmission device, the data symbols for each scheduled user into groups based on the logic resource element groups determined based on the encoding matrices each multiplexed by multiple users, the data transmission method further includes: receiving, by the transmission device, the encoding matrices and/or the mapping mode set by the network side device.

In a possible embodiment of the present disclosure, the transmission device is a network side device, and the reception device is a UE. The step of subjecting, by the transmission device, the respective groups of encoded data symbols for each user to mapping treatment based on the logic resource elements includes: mapping, by the transmission device, each group of encoded data symbols for each user to one logic resource element group and subjecting groups of data symbols mapped to an identical logic resource element group to a multiple-user multiplexing treatment.

In a possible embodiment of the present disclosure, prior to the step of classifying, by the transmission device, the data symbols for each scheduled user into groups based on the logic resource element groups determined based on the encoding matrices each multiplexed by multiple users, the data transmission method further includes: setting, by the transmission device, the encoding matrices and the mapping mode for the reception device.

Figure 7:
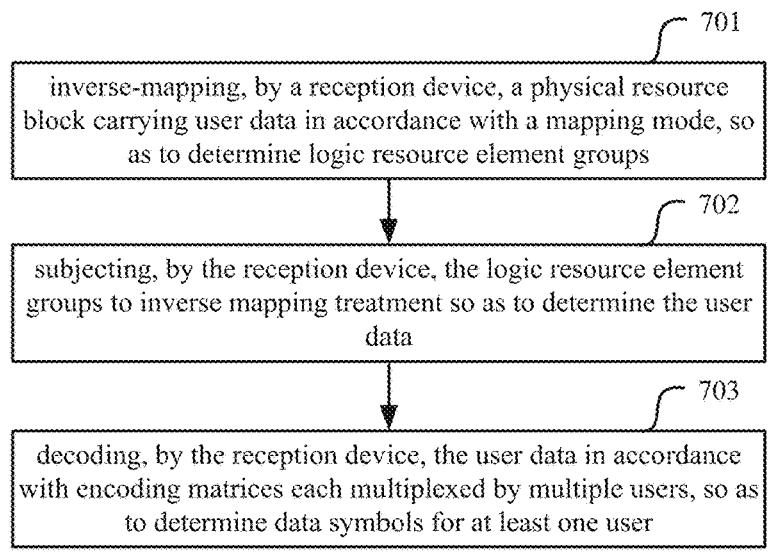
FIG. 7 is a flow chart of a data transmission method according to a seventh embodiment of the present disclosure.

As shown in FIG. 7, the present disclosure further provides in a seventh embodiment a data transmission method which includes: Step 701 of inverse-mapping, by a reception device, a physical resource block carrying user data in accordance with a mapping mode, so as to determine logic resource element groups; Step 702 of subjecting, by the reception device, the logic resource element groups to inverse mapping treatment so as to determine the user data; and Step 703 of decoding, by the reception device, the user data in accordance with encoding matrices each multiplexed by multiple users, so as to determine data symbols for at least one user.

In a possible embodiment of the present disclosure, the step of inverse-mapping, by the reception device, the physical resource block carrying the user data in accordance with the mapping mode so as to determine the logic resource element groups includes: inverse-mapping, by the reception device, the physical resource block to determine a logic resource block and inverse-mapping the logic resource block to determine the logic resource element groups in accordance with the mapping mode; or inverse-mapping, by the reception device, the physical resource block in accordance with the mapping mode so as to directly determine the logic resource element groups.

In a possible embodiment of the present disclosure, the step of inverse-mapping, by the reception device, the logic resource block to determine the logic resource element groups in accordance with the mapping mode includes: inverse-mapping, by the reception device, the logic resource block in a time-domain-before-frequency-domain or frequency-domain-before-time-domain order, so as to determine the logic resource element groups; or inverse-mapping, by the reception device, the logic resource block so as to determine interleaved logic resource element groups, and de-interleaving the interleaved logic resource element groups to determine the logic resource element groups.

In a possible embodiment of the present disclosure, the step of inverse-mapping, by the reception device, the physical resource block in accordance with the mapping mode so as to directly determine the logic resource element groups includes: inverse-mapping, by the reception device, the physical resource block in a time-domain-before-frequency-domain or frequency-domain-before-time-domain order, so as to determine the logic resource element groups; or inverse-mapping, by the reception device, the physical resource block so as to determine interleaved logic resource element groups, and de-interleaving the interleaved logic resource element groups to determine the logic resource element groups; or inverse-mapping, by the reception device, the physical resource block so as to determine logic resource element groups acquired after inter-group frequency-hopping treatment, and determining the logic resource element groups based on an inter-group frequency-hopping position and the logic resource element groups acquired after the inter-group frequency-hopping treatment.

According to the embodiments of the present disclosure, the transmission device may classify data symbols for each scheduled user in accordance with logic resource element groups determined by encoding matrices each multiplexed by multiple users, encode groups of data symbols for each user in accordance with the encoding matrices so as to determine groups of encoded data symbols for each user, subject respective groups of encoded data symbols for each user to mapping treatment based on logic resource elements, map each logic resource element group to a physical resource block in accordance with a mapping mode, and transmit data to a reception device based on the physical resource block. The logic resource element groups may be determined in accordance with the encoding matrices each multiplexed by multiple users, each logic resource element group may be mapped to the physical resource block in accordance with the mapping mode, and the data may be transmitted to the reception device based on the physical resource block; hence, it is able to perform resource mapping in case of non-orthogonal access and improve resource utilization.

Obviously, a person skilled in the art may make further modifications and improvements without departing from the spirit of the present disclosure, these modifications and improvements all fall within the scope of the present disclosure or equivalent skills and therefore should be included by the present disclosure.

What is claimed is:

1. A data transmission method, comprising steps of:
classifying, by a transmission device, data symbols for each scheduled user into groups based on logic resource element groups determined based on encoding matrices each multiplexed by a plurality of users;
encoding, by the transmission device, respective groups of data symbols for each user in accordance with the encoding matrices, to determine groups of encoded data symbols for each user;
subjecting, by the transmission device, respective groups of encoded data symbols for each user to a mapping treatment based on logic resource elements;
mapping, by the transmission device, respective logic resource element groups to a physical resource block in accordance with a mapping mode; and
transmitting, by the transmission device, data to a reception device based on the physical resource block,
wherein a column vector corresponding to each user in the encoding matrix represents an encoding rate for the user, and the encoding rates for the users are determined based on at least one of priority levels of the users, priority levels of services of the users, and geographical positions of the users.

2. The data transmission method according to claim 1, wherein resource elements corresponding to each encoding matrix multiplexed by the plurality of users are determined by the transmission device as one logic resource element group.

3. The data transmission method according to claim 1, wherein the step of mapping, by the transmission device, the respective logic resource element groups to the physical resource block in accordance with the mapping mode comprises:
mapping, by the transmission device, the respective logic resource element groups to a logic resource block and mapping the logic resource block to the physical resource block, in accordance with the mapping mode; or
mapping, by the transmission device, the respective logic resource element groups directly to the physical resource block in accordance with the mapping mode.

4. The data transmission method according to claim 3, wherein the step of mapping, by the transmission device, the respective logic resource element groups to the logic resource block and mapping the logic resource block to the physical resource block in accordance with the mapping mode comprises:

mapping, by the transmission device, the logic resource element groups to the logic resource block in a time-domain-before-frequency-domain or frequency-domain-before-time-domain order; or interleaving, by the transmission device, the logic resource element groups, and then mapping the interleaved logic resource element groups to the logic resource block.

5. The data transmission method according to claim 3, wherein the step of mapping, by the transmission device, the respective logic resource element groups directly to the physical resource block in accordance with the mapping mode comprises:

mapping, by the transmission device, the logic resource element groups to the physical resource block in a time-domain-before-frequency-domain or frequency-domain-before-time-domain order; or interleaving, by the transmission device, the logic resource element groups and then mapping the interleaved logic resource element groups to the physical resource block; or subjecting, by the transmission device, the logic resource element groups to an inter-group frequency-hopping treatment and then mapping resultant logic resource element groups to the physical resource block.

6. The data transmission method according to claim 1, wherein the transmission device is a User Equipment (UE), and the reception device is a network side device; and the step of subjecting, by the transmission device, the respective groups of encoded data symbols for each user to the mapping treatment based on the logic resource elements comprises:

mapping, by the transmission device, the groups of encoded data symbols for each user to different logic resource element groups respectively.

7. The data transmission method according to claim 6, wherein prior to the step of classifying, by the transmission device, the data symbols for each scheduled user into groups based on the logic resource element groups determined based on the encoding matrices each multiplexed by the plurality of users, the data transmission method further comprises:

receiving, by the transmission device, the encoding matrices and/or the mapping mode set by the network side device.

8. The data transmission method according to claim 1, wherein the transmission device is a network side device, and the reception device is a UE; and the step of subjecting, by the transmission device, the respective groups of encoded data symbols for each user to the mapping treatment based on the logic resource elements comprises:

mapping, by the transmission device, each group of encoded data symbols for each user to one logic resource element group and subjecting groups of data symbols mapped to an identical logic resource element group to a multiple-user multiplexing treatment.

9. The data transmission method according to claim 8, wherein prior to the step of classifying, by the transmission device, the data symbols for each scheduled user into groups based on the logic resource element groups determined based on the encoding matrices each multiplexed by the plurality of users, the data transmission method further comprises: setting, by the transmission device, the encoding matrices and the mapping mode for the reception device.

10. A data transmission method, comprising steps of:

inverse-mapping, by a reception device, a physical resource block carrying user data in accordance with a mapping mode, to determine logic resource element groups;

subjecting, by the reception device, the logic resource element groups to an inverse mapping treatment to determine the user data; and decoding, by the reception device, the user data in accordance with encoding matrices each multiplexed by a plurality of users, to determine data symbols for at least one user, wherein a column vector corresponding to each user in the encoding matrix represents an encoding rate for the user, and the encoding rates for the users are determined based on at least one of priority levels of the users priority levels of services of the users, and geographical positions of the users.

11. The data transmission method according to claim 10, wherein the step of inverse-mapping, by the reception device, the physical resource block carrying the user data in accordance with the mapping mode to determine the logic resource element groups comprises:

inverse-mapping, by the reception device, the physical resource block to determine a logic resource block and inverse-mapping the logic resource block to determine the logic resource element groups in accordance with the mapping mode; or inverse-mapping, by the reception device, the physical resource block in accordance with the mapping mode to directly determine the logic resource element groups.

12. The data transmission method according to claim 11, wherein the step of inverse-mapping, by the reception device, the logic resource block to determine the logic resource element groups in accordance with the mapping mode comprises:

inverse-mapping, by the reception device, the logic resource block in a time-domain-before-frequency-domain or frequency-domain-before-time-domain order, to determine the logic resource element groups; or inverse-mapping, by the reception device, the logic resource block to determine interleaved logic resource element groups, and de-interleaving the interleaved logic resource element groups to determine the logic resource element groups.

13. The data transmission method according to claim 11, wherein the step of inverse-mapping, by the reception device, the physical resource block in accordance with the mapping mode to directly determine the logic resource element groups comprises:

inverse-mapping, by the reception device, the physical resource block in a time-domain-before-frequency-domain or frequency-domain-before-time-domain order, to determine the logic resource element groups; or inverse-mapping, by the reception device, the physical resource block to determine interleaved logic resource element groups, and de-interleaving the interleaved logic resource element groups to determine the logic resource element groups; or inverse-mapping, by the reception device, the physical resource block to determine logic resource element groups acquired after an inter-group frequency-hopping treatment, and determining the logic resource element groups based on an inter-group frequency-hopping position and the logic resource element groups acquired after the inter-group frequency-hopping treatment.

14. A transmission device for data transmission, comprising:
 a processor;
 a memory, connected to the processor via a bus interface and configured to store therein programs and data used for operation of the processor; and
 a transceiver, connected to the processor and the memory via the bus interface, and configured to receive and transmit data under control of the processor,
 wherein the processor is configured to call and execute the programs and data stored in the memory to:
 classify data symbols for each scheduled user into groups based on logic resource element groups determined based on encoding matrices each multiplexed by a plurality of users;
 encode respective groups of data symbols for each user in accordance with the encoding matrices, to determine groups of encoded data symbols for each user;
 subject respective groups of encoded data symbols for each user to a mapping treatment based on logic resource elements;
 map respective logic resource element groups to a physical resource block in accordance with a mapping mode; and
 transmit data, via the transceiver, to a reception device based on the physical resource block,
 wherein a column vector corresponding to each user in the encoding matrix represents an encoding rate for the user, and the encoding rates for the users are determined based on at least one of priority levels of the users, priority levels of services of the users, and geographical positions of the users.

15. The transmission device according to claim 14, wherein the processor is configured to call and execute the programs and data stored in the memory to: map the respective logic resource element groups to a logic resource block and map the logic resource block to the physical resource block in accordance with the mapping mode; or map the respective logic resource element groups directly to the physical resource block in accordance with the mapping mode.

16. The transmission device according to claim 15, wherein in the case of mapping the respective logic resource element groups to the logic resource block and mapping the logic resource block to the physical resource block in accordance with the mapping mode, the processor is configured to call and execute the programs and data stored in the memory to: map the logic resource element groups to the logic resource block in a time-domain-before-frequency-domain or frequency-domain-before-time-domain order; or interleave the logic resource element groups, and then map the interleaved logic resource element groups to the logic resource block.

17. The transmission device according to claim 15, wherein in the case of mapping the respective logic resource element groups directly to the physical resource block in accordance with the mapping mode, the processor is configured to call and execute the programs and data stored in the memory to: map the logic resource element groups to the physical resource block in a time-domain-before-frequency-domain or frequency-domain-before-time-domain order; or interleave the logic resource element groups and then map the interleaved logic resource element groups to the physical resource block; or subject the logic resource element groups to an inter-group frequency-hopping treatment and then map resultant logic resource element groups to the physical resource block.

18. A reception device for data transmission, comprising:
 a processor;
 a memory, connected to the processor via a bus interface and configured to store therein programs and data used for operation of the processor; and
 a transceiver, connected to the processor and the memory via the bus interface, and configured to receive and transmit data under control of the processor,
 wherein the processor is configured to call and execute programs and data stored in the memory to:
 inverse-map a physical resource block carrying user data in accordance with a mapping mode, to determine logic resource element groups;
 subject the logic resource element groups to an inverse mapping treatment to determine the user data; and
 decode the user data in accordance with encoding matrices each multiplexed by a plurality of users, to determine data symbols for at least one user,
 wherein a column vector corresponding to each user in the encoding matrix represents an encoding rate for the user, and the encoding rates for the users are determined based on at least one of priority levels of the users, priority levels of services of the users, and geographical positions of the users.

19. The reception device according to claim 18, wherein the processor is configured to call and execute programs and data stored in the memory to: inverse-map the physical resource block to determine a logic resource block and inverse-map the logic resource block to determine the logic resource element groups in accordance with the mapping mode; or inverse-map the physical resource block in accordance with the mapping mode to directly determine the logic resource element groups.

20. The reception device according to claim 19, wherein in the case of inverse-mapping the logic resource block to determine the logic resource element groups in accordance with the mapping mode, the processor is configured to call and execute programs and data stored in the memory to: inverse-map the logic resource block in a time-domain-before-frequency-domain or frequency-domain-before-time-domain order, to determine the logic resource element groups; or inverse-map the logic resource block to determine interleaved logic resource element groups, and de-interleave the interleaved logic resource element groups to determine the logic resource element groups.

* * * * *